(12) United States Patent
Park

(10) Patent No.: US 11,846,767 B2
(45) Date of Patent: Dec. 19, 2023

(54) CAMERA MODULE

(71) Applicant: LG INNOTEK CO., LTD., Seoul (KR)

(72) Inventor: Jae Keun Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 727 days.

(21) Appl. No.: 16/964,492

(22) PCT Filed: Jan. 23, 2019

(86) PCT No.: PCT/KR2019/000937
§ 371 (c)(1),
(2) Date: Jul. 23, 2020

(87) PCT Pub. No.: WO2019/147004
PCT Pub. Date: Aug. 1, 2019

(65) Prior Publication Data
US 2021/0033844 A1 Feb. 4, 2021

(30) Foreign Application Priority Data
Jan. 24, 2018 (KR) .................. 10-2018-0008998

(51) Int. Cl.
G02B 26/00 (2006.01)
G02B 3/14 (2006.01)
(Continued)

(52) U.S. Cl.
CPC .......... G02B 26/004 (2013.01); G02B 3/14 (2013.01); G02B 7/09 (2013.01); G02B 27/646 (2013.01);
(Continued)

(58) Field of Classification Search
CPC .......... G02B 26/004; G02B 3/14; G02B 7/09; G02B 27/646; G02B 3/12; G03B 5/00;
(Continued)

(56) References Cited

U.S. PATENT DOCUMENTS

2009/0141352 A1 6/2009 Jannard et al.
2015/0304561 A1* 10/2015 Howarth .............. G02B 7/026
348/374
(Continued)

FOREIGN PATENT DOCUMENTS

CN 103364945 A 10/2013
CN 103576414 A 2/2014
(Continued)

OTHER PUBLICATIONS

Notice of Allowance dated Jul. 26, 2022 in Chinese Application No. 201980015073.9.
(Continued)

Primary Examiner — Marin Pichler
(74) Attorney, Agent, or Firm — Saliwanchik, Lloyd & Eisenschenk

(57) ABSTRACT

A camera module includes a lens assembly accommodating a liquid lens unit, and a lens-moving unit disposed along an optical axis between the lens assembly and an image sensor, the lens-moving unit being configured to move the lens assembly in a horizontal direction perpendicular to the optical axis of the liquid lens unit in response to a horizontal control signal, wherein the lens-moving unit includes a fixed body, a moving body disposed on the fixed body so as to be movable in the horizontal direction, and a plurality of wires configured to contract or expand independently of each other so as to move the moving body in the horizontal direction in response to the horizontal control signal, each of the plurality of wires including one end connected to the fixed body and an opposite end connected to the moving body.

19 Claims, 10 Drawing Sheets

(51) Int. Cl.
  *G02B 7/09* (2021.01)
  *G02B 27/64* (2006.01)
  *G03B 13/36* (2021.01)
  *G03B 5/00* (2021.01)
(52) U.S. Cl.
  CPC ............... *G03B 5/00* (2013.01); *G03B 13/36* (2013.01); *G03B 2205/0007* (2013.01)
(58) Field of Classification Search
  CPC ........... G03B 13/36; G03B 2205/0007; G03B 2205/0015; G03B 2205/0053; G03B 3/10
  USPC ......................................... 359/665, 823, 557
  See application file for complete search history.

(56) References Cited

U.S. PATENT DOCUMENTS

| 2017/0054883 | A1  | 2/2017  | Sharma et al. |            |
|--------------|-----|---------|---------------|------------|
| 2017/0315274 | A1* | 11/2017 | Park          | G02B 27/646 |
| 2018/0031854 | A1* | 2/2018  | Hu            | G03B 3/10  |

FOREIGN PATENT DOCUMENTS

| CN | 104956254 A      | 9/2015  |
|----|------------------|---------|
| KR | 10-2015-0102966 A | 9/2015  |
| KR | 10-2015-0127792 A | 11/2015 |
| KR | 10-2016-0088859 A | 7/2016  |
| WO | WO-2012/020212 A1 | 2/2012  |
| WO | WO-2017/030639 A1 | 2/2017  |
| WO | WO-2017/188798 A1 | 11/2017 |

OTHER PUBLICATIONS

International Search Report dated May 1, 2019 in International Application No. PCT/KR2019/000937.

Supplementary European Search Report dated Sep. 15, 2021 in European Application No. 19744263.5.

Office Action dated Aug. 4, 2021 in Chinese Application No. 201980015073.9.

\* cited by examiner

CAMERA MODULE

CROSS-REFERENCE TO RELATED APPLICATIONS

This application is the U.S. national stage application of International Patent Application No. PCT/KR2019/000937, filed Jan. 23, 2019, which claims the benefit under 35 U.S.C. § 119 of Korean Patent Application No. 10-2018-0008998, filed Jan. 24, 2018, the disclosures of each of which are incorporated herein by reference in their entirety.

TECHNICAL FIELD

Embodiments relate to a camera module.

BACKGROUND ART

People who use portable devices demand optical devices that have high resolution, are small, and have various photographing functions. For example, these various photographing functions may be at least one of an optical zoom-in/zoom-out function, an auto-focusing (AF) function, or a hand-tremor compensation or optical image stabilizer (OIS) function.

In a conventional art, in order to implement the above-described various photographing functions, a method of combining a plurality of lenses and directly moving the combined lenses is used. In the case in which the number of lenses is increased, however, the size of an optical device may increase.

The auto-focusing and hand-tremor compensation functions are performed by moving or tilting a plurality of lenses, which are fixed to a holder and are aligned along an optical axis, in an optical-axis direction or a direction perpendicular to the optical axis. To this end, a separate lens-moving apparatus is used to move a lens assembly composed of a plurality of lenses. However, the lens-moving apparatus has high power consumption, and an additional cover glass needs to be provided separately from a camera module in order to protect the lens-moving apparatus, thus causing a problem in that the overall size of the conventional camera module increases. In order to solve this, studies have been conducted on a liquid lens unit, which performs auto-focusing and hand-tremor compensation functions by electrically adjusting the curvature of an interface between two types of liquids. However, there is a need to further improve the OIS function of a liquid lens unit.

DISCLOSURE

Technical Problem

Embodiments may provide a camera module capable of more effectively performing both an AF function and an OIS function.

The objects to be accomplished by the embodiments are not limited to the above-mentioned objects, and other objects not mentioned herein will be clearly understood by those skilled in the art from the following description.

Technical Solution

A camera module according to an embodiment may include a lens assembly accommodating a liquid lens unit, an image sensor disposed along the optical axis of the liquid lens unit, a lens-moving unit disposed along the optical axis between the lens assembly and the image sensor and configured to move the lens assembly in a horizontal direction perpendicular to the optical axis of the liquid lens unit in response to a horizontal control signal, and a control unit configured to supply a driving voltage to drive the liquid lens unit such that the focal length oriented along the optical axis is changed and to generate the horizontal control signal. The lens-moving unit may include a fixed body, a moving body disposed on the fixed body so as to be movable in the horizontal direction and including a support surface supporting the lens assembly, and a plurality of wires configured to contract or expand independently of each other so as to move the moving body in the horizontal direction in response to the horizontal control signal, each of the plurality of wires including one end connected to the fixed body and an opposite end connected to the moving body.

For example, the lens-moving unit may further include a plurality of balls disposed between the fixed body and the moving body so as to support the moving body and to be rotatable.

For example, the control unit may include a liquid-lens-driving unit configured to generate the driving voltage, a wire-driving unit configured to generate a plurality of electrical signals as the horizontal control signal to respectively contract or expand the plurality of wires, and a main board on which the image sensor is disposed.

For example, the camera module may further include a signal transmission unit configured to transmit the driving voltage generated by the liquid-lens-driving unit to the liquid lens unit.

For example, the liquid lens unit may include a liquid lens including a plate accommodating different types of first and second liquids and first and second electrodes respectively disposed on one surface and the opposite surface of the plate to receive the driving voltage, a first connection substrate including one end connected to the first electrode, and a second connection substrate including one end connected to the second electrode.

For example, the signal transmission unit may include a first connection part including one end connected to the first connection substrate, a second connection part including one end connected to the second connection substrate, a first pad connected to the opposite end of the first connection part, a second pad connected to the opposite end of the second connection part, a third connection substrate connecting the first pad to the liquid-lens-driving unit, and a fourth connection substrate connecting the second pad to the liquid-lens-driving unit.

For example, the camera module may further include a base accommodating the lens assembly and disposed on the support surface of the moving body, and the first and second connection parts may be disposed on the surface of the base.

For example, the signal transmission unit may further include a first elastic member electrically connecting the first pad to the third connection substrate and a second elastic member electrically connecting the second pad to the fourth connection substrate.

For example, the first and second pads may be disposed on the top surface of the moving body so as to be spaced apart from each other, and the first and second elastic members may be respectively connected to the first and second pads via the moving body.

For example, one end of at least one of the first or second elastic member may be connected to a lower portion or a side portion of the moving body.

For example, the lens-moving unit may further include a plurality of fifth connection substrates respectively electrically connecting the wire-driving unit to the plurality of wires.

For example, the moving body may include a plurality of moving segments electrically isolated from each other, and the inner sides of the plurality of moving segments may define a path along which light travels from the liquid lens unit to the image sensor.

For example, the plurality of wires may include a first wire including one end connected to a first movable point of a first moving segment, among the plurality of moving segments, and an opposite end connected to a first fixed point of the fixed body, a second wire including one end connected to the first movable point of the first moving segment and an opposite end connected to a second fixed point of the fixed body, a third wire including one end connected to a second movable point of a second moving segment, among the plurality of moving segments, and an opposite end connected to a third fixed point of the fixed body, and a fourth wire including one end connected to the second movable point of the second moving segment and an opposite end connected to a fourth fixed point of the fixed body.

For example, the first movable point and the second movable point may face each other in a diagonal direction in a plane, the first fixed point and the second fixed point may face each other in a diagonal direction in a plane, the third fixed point and the fourth fixed point may face each other in a diagonal direction in a plane, the first fixed point and the third fixed point may be adjacent to each other, and the second fixed point and the fourth fixed point may be adjacent to each other.

Advantageous Effects

A camera module according to embodiments has the following effects.

A liquid lens unit performs only an AF function, and a lens-moving unit, which is disposed between a lens assembly and an image sensor along an optical axis, performs an OIS function. Thereby, the OIS function may be accurately performed and enhanced. Accordingly, the resolution of a peripheral region of an image acquired through the image sensor may be improved.

Further, the camera module performs the OIS function using a plurality of wires, rather than using a magnet, and therefore has a smaller size than a camera module that performs an OIS function using a magnet, and thus is capable of being used for, for example, a dual-camera module.

However, the effects achievable through the embodiments are not limited to the above-mentioned effects, and other effects not mentioned herein will be clearly understood by those skilled in the art from the following description.

BEST MODE

Figure 1:
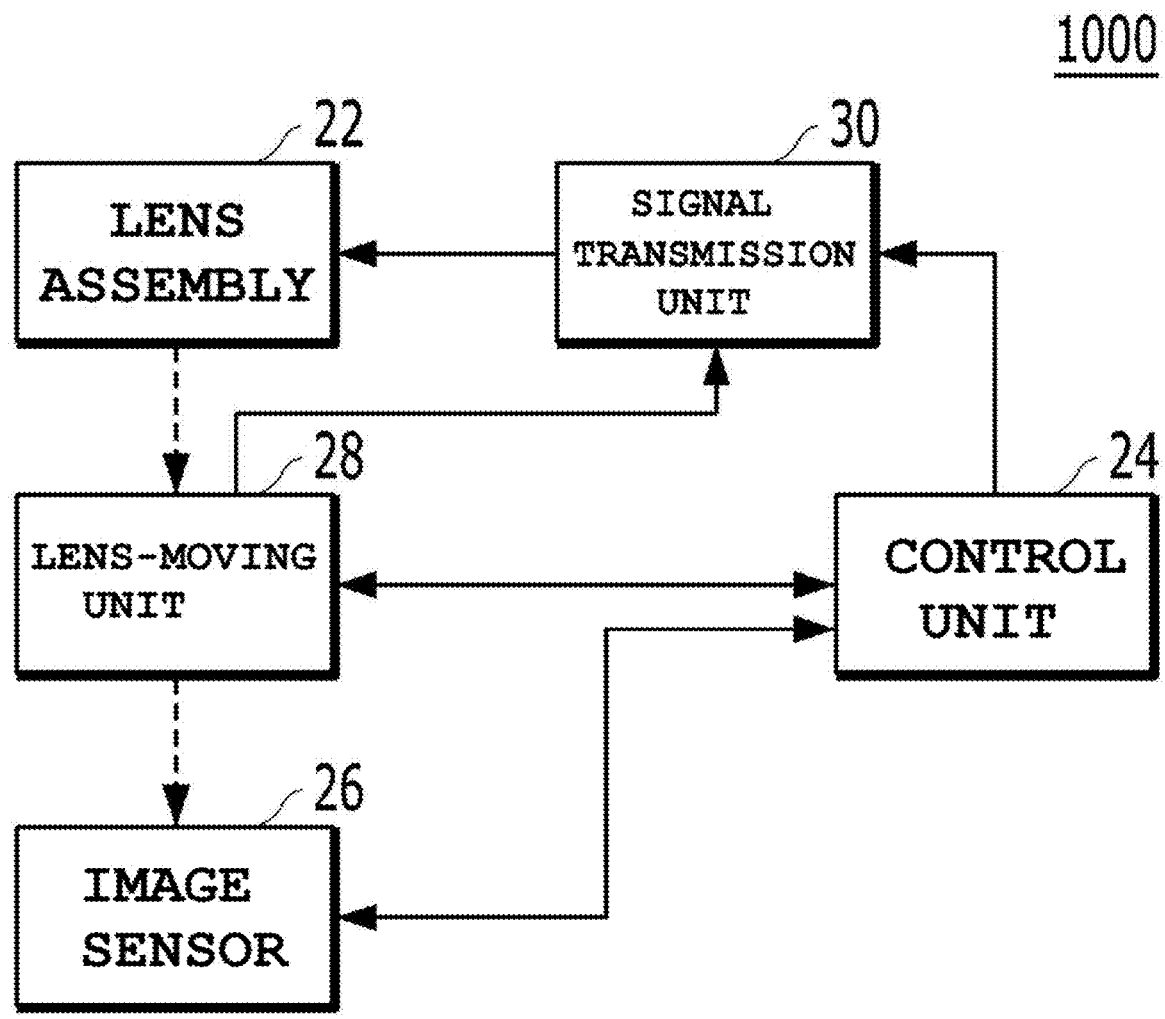
FIG. 1 illustrates a schematic block diagram of a camera module according to an embodiment.

Hereinafter, exemplary embodiments will be described in detail with reference to the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

The terms used in the present specification are used for explaining a specific exemplary embodiment, not to limit the present disclosure. Singular expressions include plural expressions unless clearly specified otherwise in context. In the specification, the terms "comprising" or "including" shall be understood to designate the presence of features, numbers, steps, operations, elements, parts, or combinations thereof, but not to preclude the presence or addition of one or more other features, numbers, steps, operations, elements, parts, or combinations thereof.

Unless otherwise defined, all terms including technical and scientific terms used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, various exemplary embodiments described herein may be combined with each other, unless specifically mentioned otherwise.

In addition, with regard to an omission in the description of any one of various exemplary embodiments, the description of other embodiments may be applied thereto, unless specifically mentioned otherwise.

Hereinafter, camera modules 1000 and 1000A according to embodiments will be described using the Cartesian coordinate system, but the embodiment is not limited thereto. In addition, in the Cartesian coordinate system, an x-axis, a y-axis, and a z-axis are perpendicular to each other, but the embodiment is not limited thereto. That is, the x-axis, the y-axis, and the z-axis may intersect each other obliquely, rather than being perpendicular to each other.

Hereinafter, a camera module 1000 according to an embodiment will be described with reference to FIG. 1.

FIG. 1 illustrates a schematic block diagram of the camera module 1000 according to an embodiment. Here, the solid lines indicate flow of signals, and the dotted lines indicate the direction in which light travels.

Referring to FIG. 1, the camera module 1000 may include a lens assembly 22, a control unit 24, an image sensor 26, and a lens-moving unit 28.

First, the lens assembly 22 may include a lens unit and a holder accommodating the lens unit. As will be described later, the lens unit may include a liquid lens, and may further include a first lens unit or a second lens unit. Alternatively, the lens unit may include all of a liquid lens unit and first and second lens units. Here, the liquid lens may be included in a liquid lens unit, which will be described later, and the lens assembly 22 may include the liquid lens unit.

The image sensor 26 may be disposed along an optical axis of the liquid lens unit, and may function to convert the light that has passed through the lens assembly 22 and the lens-moving unit 28 into image data. To this end, the control unit 24 may control the image sensor 26.

The lens-moving unit 28 may be disposed along the optical axis between the lens assembly 22 and the image sensor 26, and may move the lens assembly 22 in a horizontal direction in response to a horizontal control signal output from the control unit 24. Here, the horizontal direction may be a direction perpendicular to the optical axis of the liquid lens unit. When the optical-axis direction is the z-axis direction, the horizontal direction may be any arbitrary direction in the x-y horizontal plane, which is perpendicular to the z-axis direction.

The control unit 24 serves to generate a driving voltage (or an operation voltage) for driving the liquid lens unit and to supply the driving voltage to the liquid lens unit in order to change the focal length along the optical axis, and/or serves to generate a horizontal control signal.

The control unit 24 and the image sensor 26 described above may be disposed on a single printed circuit board (PCB), but this is merely an example, and the embodiment is not limited thereto.

When the camera module 1000 according to the embodiment is applied to an optical device (or an optical instrument), the configuration of the control unit 24 may be designed in different ways depending on the specifications required in the optical device. In particular, the control unit 24 may be implemented as a single chip so as to generate a driving voltage to be applied to the lens assembly 22 and to generate a horizontal control signal to be applied to the lens-moving unit 28. Thereby, the size of an optical device to be mounted in a portable device may be further reduced.

In addition, the camera module 1000 may further include a signal transmission unit 30. The signal transmission unit 30 serves to transmit the driving voltage generated by the control unit 24 to the liquid lens unit. To this end, the signal transmission unit 30 may directly receive a driving voltage from the control unit 24, or may receive a driving voltage via the lens-moving unit 28.

In some cases, the camera module 1000 may not include the signal transmission unit 30. In this case, the driving voltage generated by the control unit 24 may be directly transmitted to the lens assembly 22. The embodiment is not limited as to the specific path along which a driving voltage is transmitted to the liquid lens unit.

Figure 2:
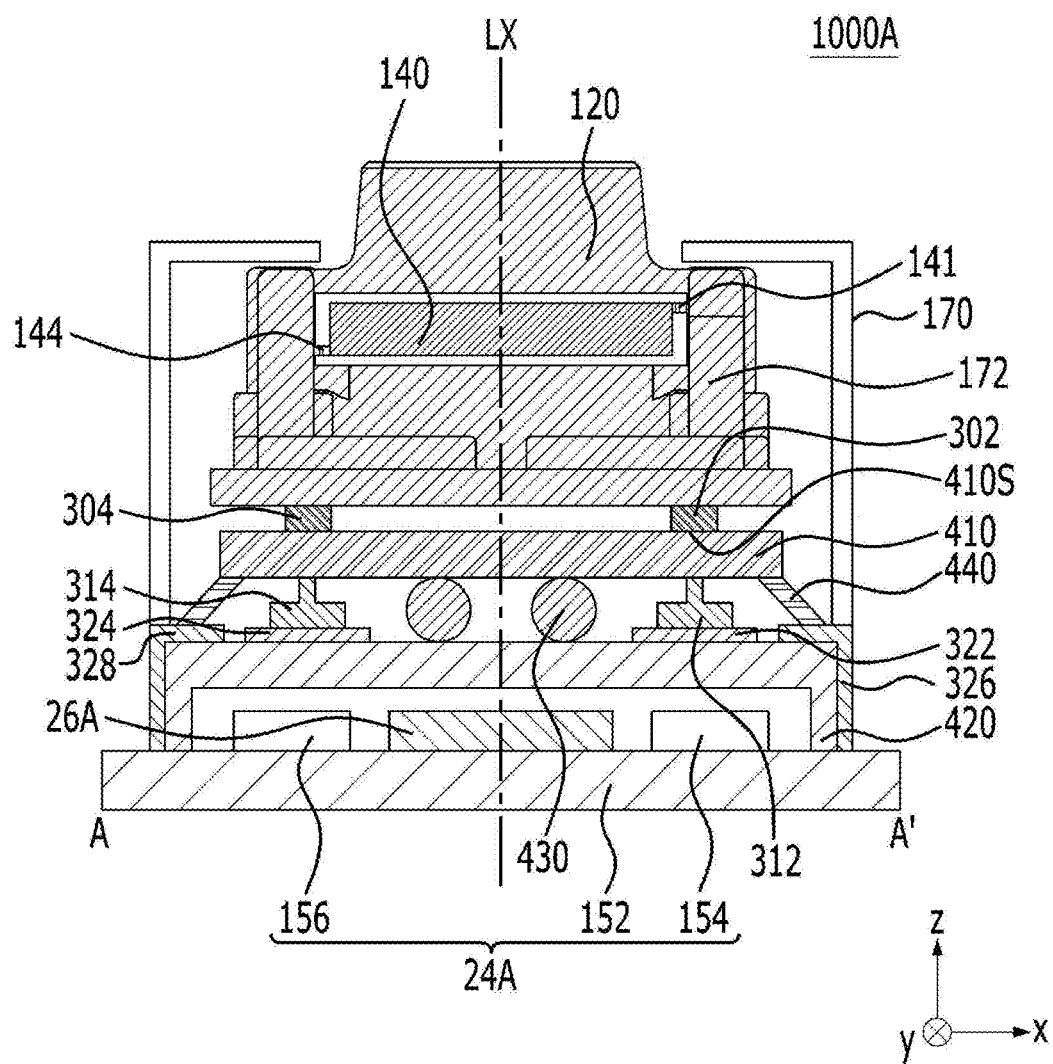
FIG. 2 illustrates a cross-sectional view of an embodiment of the camera module shown in FIG. 1.

FIG. 2 illustrates a cross-sectional view of an embodiment 1000A of the camera module 1000 shown in FIG. 1.

Referring to FIG. 2, the camera module 1000A may include a lens assembly, a control unit 24A, an image sensor 26A, and a lens-moving unit, and may further include a signal transmission unit. The lens assembly, the control unit 24A, the image sensor 26A, and the lens-moving unit shown in FIG. 2 respectively perform the same functions as the lens assembly 22, the control unit 24, the image sensor 26, and the lens-moving unit 28 shown in FIG. 1. Thus, a duplicate description of the functions of the components 22, 24, 26 and 28 will be omitted.

First, the control unit 24A may include a main board 152, a liquid-lens-driving unit 154, and a wire-driving unit 156.

The image sensor 26A may be disposed on the main board 152 along the optical axis LX of the liquid lens unit 140.

The liquid-lens-driving unit 154 may generate a driving voltage for driving (or operating) the liquid lens unit 140, and may supply the generated driving voltage to the liquid lens unit 140. As described above, the driving voltage generated by the liquid-lens-driving unit 154 may be supplied to the liquid lens unit 140 via the lens-moving unit and the signal transmission unit. Alternatively, the driving voltage generated by the liquid-lens-driving unit 154 may be supplied to the liquid lens unit 140 via only the signal transmission unit, without passing through the lens-moving unit. Alternatively, the driving voltage generated by the liquid-lens-driving unit 154 may be directly provided to the liquid lens unit 140, without passing through the lens-moving unit or the signal transmission unit.

The wire-driving unit 156 may generate a plurality of electrical signals as horizontal control signals to respectively deform (i.e. contract or expand) a plurality of wires 440, and may output the generated horizontal control signals to the plurality of wires 440. Here, the wires may be muscle wires (shape memory alloy (SMA)).

Figure 3:
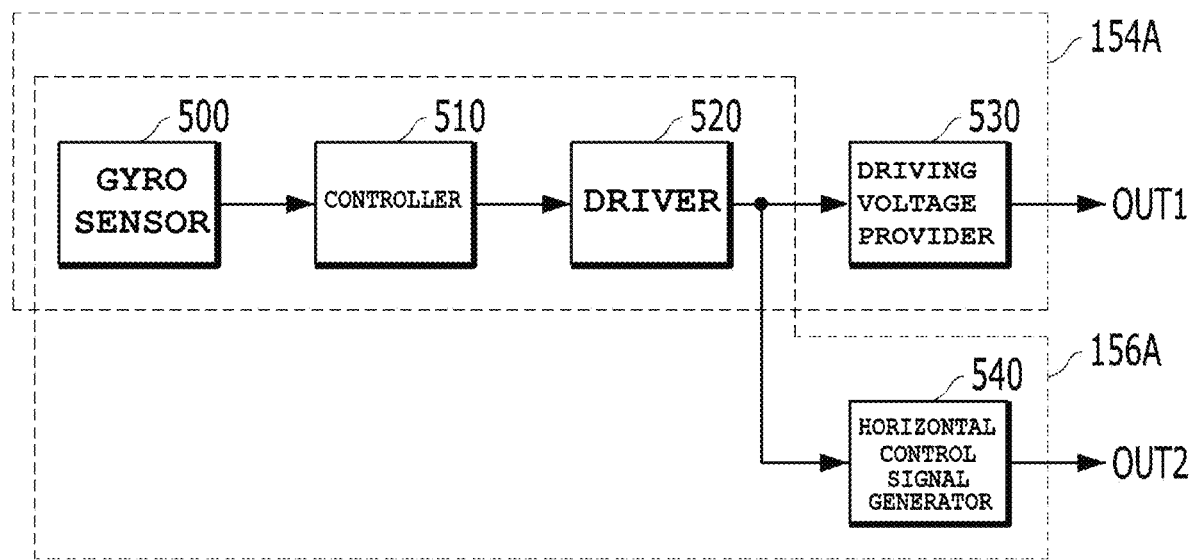
FIG. 3 illustrates a block diagram of embodiments of the liquid-lens-driving unit and the wire-driving unit shown in FIG. 2.

FIG. 3 illustrates a block diagram of embodiments 154A and 156A of the liquid-lens-driving unit 154 and the wire-driving unit 156 shown in FIG. 2.

The liquid-lens-driving unit 154A may control the operation of the liquid lens unit 140 including the liquid lens 142. The liquid-lens-driving unit 154A may have a configuration for performing a focusing function, and may control the liquid lens 142 included in the lens assembly using a user request or a sensed result (e.g. a motion signal of a gyro sensor). The liquid-lens-driving unit 154A may include a controller 510, a driver 520, and a driving voltage provider 530, and may further include a gyro sensor 500.

The wire-driving unit 156A may control movement of the lens-moving unit in the horizontal direction. The wire-driving unit 156A may have a configuration for performing a hand-tremor compensation or optical image stabilizer (OIS) function, and may control the lens-moving unit using a user request or a sensed result (e.g. a motion signal of the gyro sensor). The wire-driving unit 156A may include the controller 510, the driver 520, and a horizontal control signal generator 540, and may further include the gyro sensor 500.

The gyro sensor 500 may be an independent component that is not included in the liquid-lens-driving unit 154A or the wire-driving unit 156A, or may be included in the liquid-lens-driving unit 154A or the wire-driving unit 156A. The gyro sensor 500 may sense the angular velocity of movement in two directions, including a yaw-axis direction and a pitch-axis direction, in order to compensate for hand tremor in the vertical and horizontal directions of the optical device. The gyro sensor 500 may generate a motion signal corresponding to the sensed angular velocity, and may provide the motion signal to the controller 510.

The controller 510 may remove a high frequency noise component from the motion signal using a low-pass filter (LPF) so as to extract only a desired frequency band for implementation of the AF and OIS functions, may calculate the amount of hand tremor using the motion signal from which the noise has been removed, and may calculate the level of an electrical signal corresponding to the amount of movement that the lens-moving unit needs to move and the level of a driving voltage to be supplied to the liquid lens unit 140 in order to compensate for the calculated amount of hand tremor.

The controller 510 may receive information for the AF function (i.e. information on the distance to an object) from an internal component (e.g. the image sensor 26A) or an external component (e.g. a distance sensor or an application processor) of the optical device or the camera module 1000 or 1000A, and may calculate a driving voltage corresponding to the desired shape of the liquid lens 142 based on a focal length, which is required to focus on the object, using the distance information.

In order to implement the function of the liquid-lens-driving unit 154A, the controller 510 may store a driving voltage table in which a driving voltage and a driving voltage code for making the driver 520 generate the driving voltage are mapped, may acquire a driving voltage code corresponding to the calculated driving voltage with reference to the driving voltage table, and may output the acquired driving voltage code to the driver 520. The driver 520 may generate, based on a driving voltage code in a digital form provided from the controller 510, a driving voltage in an analog form corresponding to the driving voltage code, and may provide the driving voltage to the driving voltage provider 530. The driver 520 may include a voltage booster, which increases a voltage level upon receiving a supply voltage (e.g. a voltage supplied from a separate power supply circuit), a voltage stabilizer for stabilizing the output of the voltage booster, and a switching unit for selectively supplying the output of the voltage booster to each terminal of the liquid lens 142. Here, the switching unit may include a circuit component called an H bridge. A high voltage output from the voltage booster is applied as a power supply voltage of the switching unit. The switching unit may selectively supply the applied power supply voltage and a ground voltage to opposite ends of the liquid lens 280. A pulse-type voltage having a predetermined width may be applied to each electrode sector of the liquid lens 142, and the driving voltage applied to the liquid lens 142 is the difference between the voltages respectively applied to the first electrode and the second electrode. In addition, in order to allow the driver 520 to control the driving voltage applied to the liquid lens 142 depending on a driving voltage code in a digital form provided from the controller 510, the voltage booster may control an increase in a voltage level, and the switching unit may control the phase of a pulse voltage applied to the first electrode and the second electrode so as to generate a driving voltage in an analog form, which corresponds to the driving voltage code.

In addition, in order to implement the function of the wire-driving unit 156A, the controller 510 may store an electrical signal table in which an electrical signal for operating the wires and an electrical signal code for making the driver 520 generate the electrical signal are mapped, may acquire an electrical signal code corresponding to the calculated electrical signal with reference to the electrical signal table, and may output the acquired electrical signal code to the driver 520. The driver 520 may generate, based on an electrical signal code in a digital form provided from the controller 510, an electrical signal in an analog form corresponding to the electrical signal code, and may provide the electrical signal to the horizontal control signal generator 540. A pulse-type electrical signal having a predetermined width may be applied to the wires 440.

The liquid-lens-driving unit 154A or the wire-driving unit 156A may further include a connector (not shown), which performs a communication or interface function. The connector may receive power from an external source (e.g. a battery), and may supply the power required for the operation of each of the components 500, 510, 520, 530 and 540.

The driving voltage provider 530 may receive a driving voltage from the driver 520, and may provide the driving voltage required for the liquid lens 142 through an output terminal OUT1. Here, the driving voltage may be an analog voltage applied between one first electrode (or individual electrode) and one second electrode (or common electrode).

In addition, the horizontal control signal generator 540 may receive an electrical signal in an analog form from the driver 520, and may provide an electrical signal corresponding to the amount of movement of the lens-moving unit as a horizontal control signal through an output terminal OUT2.

According to an embodiment, as shown in FIG. 3, the controller 510 and the driver 520 are used in common both for the liquid-lens-driving unit 154A and for the wire-driving unit 156A. However, according to another embodiment, the controller and the driver of the liquid-lens-driving unit 154A may be provided separately from the controller and the driver of the wire-driving unit 156A. Further, according to an embodiment, as shown in FIG. 3, the gyro sensor 500 may be used in common both for the liquid-lens-driving unit 154A and for the wire-driving unit 156A. However, according to another embodiment, the gyro sensor of the liquid-lens-driving unit 154A may be provided separately from the gyro sensor of the wire-driving unit 156A.

Further, the liquid-lens-driving unit 154 and the wire-driving unit 156 shown in FIG. 3 are merely given by way of example, and the embodiment is not limited thereto. That is, each of the liquid-lens-driving unit 154 and the wire-driving unit 156 shown in FIG. 2 may have a configuration different from that shown in FIG. 3.

Referring again to FIG. 2, the lens-moving unit may include a moving body 410, a fixed body 420, and a plurality of wires 440, and may further include a plurality of balls 430.

The fixed body 420 may be disposed between the main board 152 and the lens assembly.

The moving body 410 may be disposed above the fixed body 420 so as to be movable in the horizontal direction, and may include a support surface 410S supporting the lens assembly. For example, the moving body 410 may be made of a conductive material or a non-conductive material.

The plurality of balls 430 may be disposed between the fixed body 420 and the moving body 410 so as to support the moving body 410 and to be rotatable (or rollable). Accordingly, the plurality of balls 430 may assist movement of the moving body 410 in the horizontal direction. According to another embodiment, rollers may be used instead of the plurality of balls 430. However, the embodiment is not limited as to the specific type of balls or rollers, so long as they are capable of rolling or rotating.

In addition, each of the plurality of wires 440 may have one end connected to the fixed body 420 and an opposite end connected to the moving body 410. Each of the plurality of wires 440 has expansion and contraction characteristics so that the length thereof is changed in response to an electrical signal included in a horizontal control signal. The plurality of wires 440 may independently contract or expand so as to move the moving body 410 in the horizontal direction in response to the horizontal control signal.

Figure 4A:
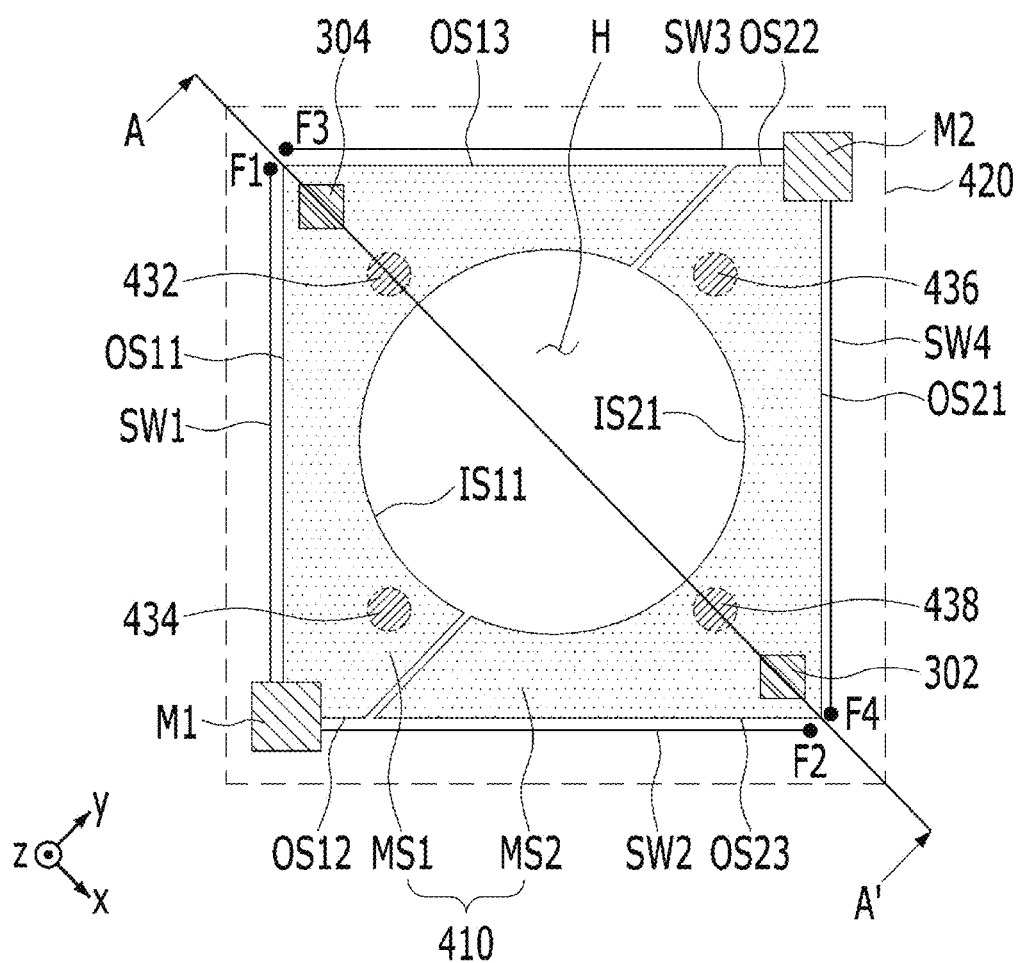
FIGS. 4A and 4B illustrate a plan view and a bottom view, respectively, of an embodiment of the moving body shown in FIG. 2.
Figure 4B:
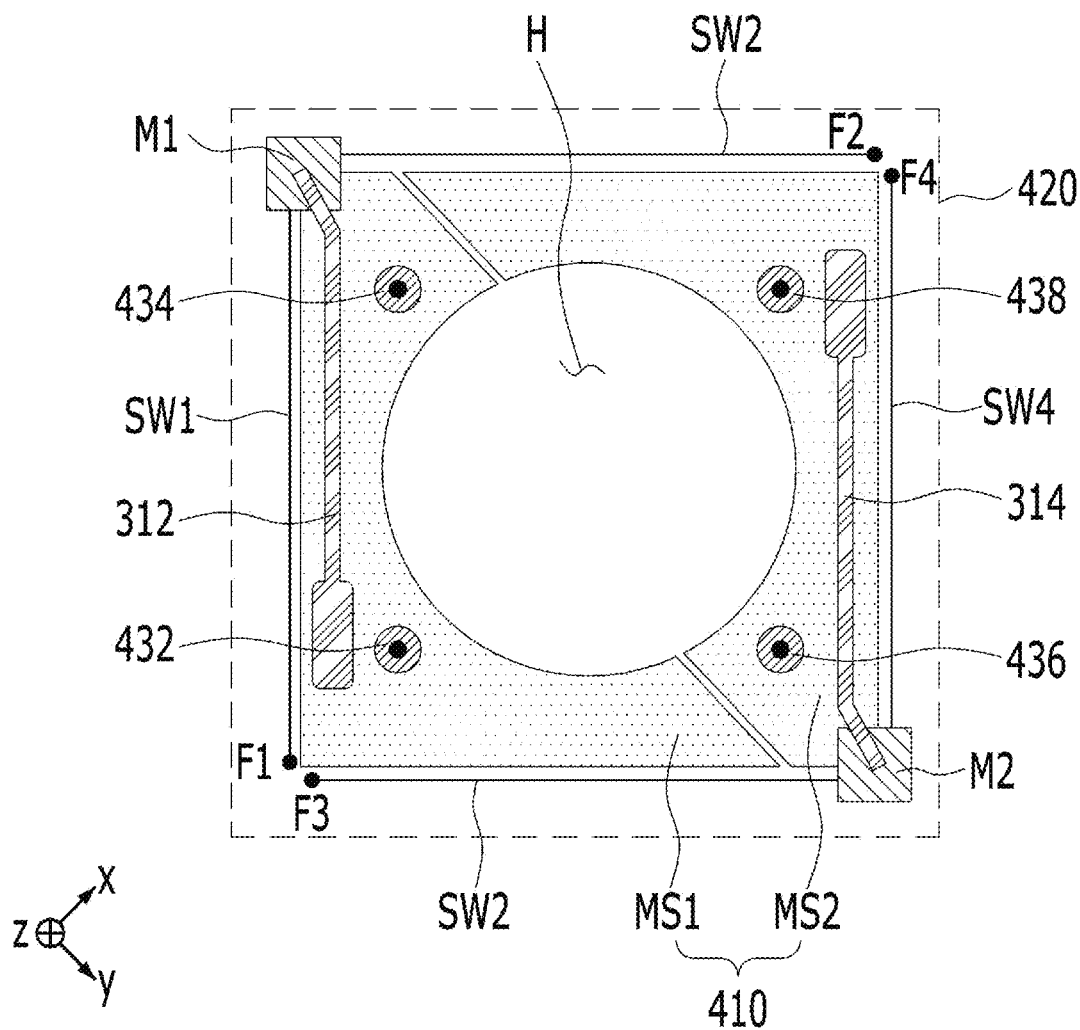

FIGS. 4A and 4B illustrate a plan view and a bottom view, respectively, of an embodiment of the moving body 410 shown in FIG. 2.

FIG. 2 may correspond to a cross-sectional view taken along line A-A' in FIG. 4A. In this case, the wires 440 shown in FIG. 2 are depicted for a better understanding of the wires SW1 to SW4 shown in FIG. 4A, and the positions thereof do not accurately coincide with the positions of the wires SW1 to SW4 shown in FIG. 4A.

In the case in which the moving body 410 is made of a conductive material, the moving body 410 may be divided into a plurality of moving segments, which are electrically isolated from each other. For example, as shown in FIGS. 4A and 4B, the moving body 410 may include first and second moving segments MS1 and MS2, which are separated from each other so as to be electrically isolated from each other.

Hereinafter, the moving body 410 will be described as including the two first and second moving segments MS1 and MS2. However, the following description may also be applied to the configuration in which the moving body 410 is divided into three or more moving segments.

The inner sides of the plurality of moving segments may define a path H along which light travels from the liquid lens unit 140 to the image sensor 26A. The fixed portion 420 may also have a planar shape for defining the path H shown in FIG. 4A or 4B.

The first moving segment MS1 may include a first inner side IS11 and $1\text{-}1^{st}$ to $1\text{-}3^{rd}$ outer sides OS11, OS12 and OS13. The second moving segment MS2 may include a second inner side IS21 and $2\text{-}1^{st}$ to $2\text{-}3^{rd}$ outer sides OS21, OS22 and OS23. The space between the first inner side IS11 of the first moving segment MS1 and the second inner side IS21 of the second moving segment MS2 may define the path H along which light travels.

In addition, as shown in FIGS. 4A and 4B, the planar shape formed by the $1\text{-}1^{st}$ to $1\text{-}3^{rd}$ and $2\text{-}1^{st}$ to $2\text{-}3^{rd}$ outer sides OS11, OS12, OS13, OS21, OS22 and OS23 of the moving body 410 may be a rectangular shape, but the embodiment is not limited thereto. That is, the planar shape formed by the outer sides of the moving body 410 may be a polygonal shape, a circular shape, or an elliptical shape, rather than being a rectangular shape. Hereinafter, the planar shape formed by the outer sides of the moving body 410 will be described as being a rectangular shape. However, the following description of the moving body 410 may also be applied to the configuration in which the planar shape formed by the outer sides of the moving body 410 is any of shapes other than the rectangular shape.

The plurality of wires may include first to fourth wires SW1 to SW4.

The first wire SW1 has one end connected to a first movable point M1 of the first moving segment MS1, among the plurality of moving segments, and an opposite end connected to a first fixed point F1 of the fixed body 420.

The second wire SW2 has one end connected to the first movable point M1 of the first moving segment MS1 and an opposite end connected to a second fixed point F2 of the fixed body 420. The first fixed point F1 and the second fixed point F2 may be disposed so as to face each other in a diagonal direction in a plane, but the embodiment is not limited thereto.

The third wire SW3 has one end connected to a second movable point M2 of the second moving segment MS2, among the plurality of moving segments, and an opposite end connected to a third fixed point F3 of the fixed body 420. The first movable point M1 and the second movable point M2 may be disposed so as to face each other in a diagonal direction in a plane, but the embodiment is not limited thereto. The first fixed point F1 and the third fixed point F3 may be disposed adjacent to each other, but the embodiment is not limited thereto.

The fourth wire SW4 has one end connected to the second movable point M2 of the second moving segment MS2 and an opposite end connected to a fourth fixed point F4 of the fixed body 420. The third fixed point F3 and the fourth fixed point F4 may be disposed so as to face each other in a diagonal direction in a plane, but the embodiment is not limited thereto. The second fixed point F2 and the fourth fixed point F4 may be disposed adjacent to each other, but the embodiment is not limited thereto.

When each of the first to fourth wires SW1 to SW4 contracts or expands in response to an electrical signal included in a horizontal control signal, the above-described first to fourth fixed points F1 to F4, which are connected to the fixed body 420, may be kept stationary without being moved, but the above-described first and second movable points M1 and M2, which are connected to the moving body 410, may be moved without being fixed.

Referring to FIGS. 4A and 4B, the first movable point M1 is a point at which the first moving segment MS1 and the first and second wires SW1 and SW2 are connected to each other, and the second movable point M2 is a point at which the second moving segment MS2 and the third and fourth wires SW3 and SW4 are connected to each other. To this end, a first connection member (not shown) for electrically connecting the first moving segment MS1 and the first and second wires SW1 and SW2 to each other may be disposed at the first movable point M1, and a second connection member (not shown) for electrically connecting the second moving segment MS2 and the third and fourth wires SW3 and SW4 to each other may be disposed at the second movable point M2. However, the embodiment is not limited thereto.

That is, according to another embodiment, the first and second wires SW1 and SW2 may be directly electrically connected to the first moving segment MS1 at the first movable point M1, and the third and fourth wires SW3 and SW4 may be directly electrically connected to the second moving segment MS2 at the second movable point M2.

In FIGS. 4A and 4B, the positions on the top surface and the bottom surface of the moving body 410 corresponding to the plurality of balls 430 (432, 434, 436 and 438) are respectively indicated by dotted lines and solid lines. It can be seen that the plurality of balls 430 is provided in a symmetrical arrangement on the fixed body 420 in order to support the moving body 410 and to be rotatable when the moving body 410 moves in the horizontal direction. The plurality of balls 430 may be provided in a symmetrical arrangement with respect to the optical axis.

Meanwhile, the lens assembly may include at least one of a first lens unit (not shown), a holder 120, a second lens unit (not shown), or a liquid lens unit 140, and may be disposed on the main board 152.

In the lens assembly, the first lens unit and the second lens unit may be referred to as a 'first solid lens unit' and a 'second solid lens unit', respectively, in order to be distinguished from the liquid lens unit 140. However, the lens assembly may not include the first and second lens units.

The first lens unit may be disposed at the upper side of the lens assembly, and may be a region on which light is incident from outside the lens assembly. That is, the first lens unit may be disposed above the liquid lens unit 140 within the holder 120. The first lens unit may be implemented as a single lens, or may be implemented as two or more lenses. In this case, two or more lenses may be aligned along a center axis to form an optical system.

Here, the center axis may be an optical axis LX of the optical system, which is formed by at least one of the first lens unit, the liquid lens unit 140, or the second lens unit included in the camera module 1000A, or may be an axis parallel to the optical axis LX. The optical axis LX may correspond to the center axis of the image sensor 26A. That is, the first lens unit, the liquid lens unit 140, the second lens unit, and the image sensor 26A may be aligned with each other along the optical axis LX and may be disposed so as to overlap each other through active alignment (AA).

Here, active alignment may mean an operation of aligning the optical axes of the first lens unit, the second lens unit, and the liquid lens unit 140 with each other and adjusting an axial relationship or distance relationship between the image sensor 26A and the lens units in order to acquire an improved image.

In FIG. 2, an exposure lens may be disposed at the upper side of the first lens unit. Here, the exposure lens may be the outermost lens among the lenses included in the first lens unit. That is, the lens located at the uppermost side of the first lens unit may protrude upwards, and therefore, may function as the exposure lens. The exposure lens faces the risk of damage to the surface thereof since it protrudes outwards from the holder 120. When the surface of the exposure lens is damaged, the quality of an image captured by the camera module 1000A may be deteriorated. Therefore, in order to inhibit or suppress damage to the surface of the exposure lens, a cover glass may be disposed, or a coating layer may be formed on the top of the exposure lens. Alternatively, in order to inhibit damage to the surface of the exposure lens, the exposure lens may be formed of a wear-resistant material having higher rigidity than the lenses of the other lens units.

Figure 5:
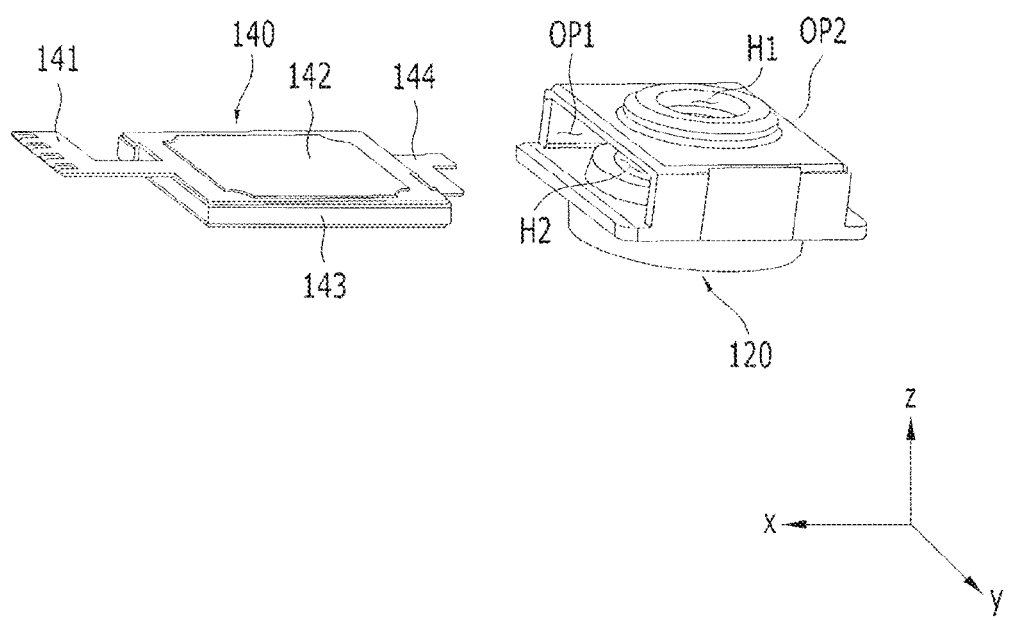
FIG. 5 is an exploded perspective view for explaining the configurations of the holder and the liquid lens unit shown in FIG. 2.

FIG. 5 is an exploded perspective view for explaining the configurations of the holder 120 and the liquid lens unit 140 shown in FIG. 2.

The holder 120 shown in FIG. 5 may include first and second holes H1 and H2 and first to fourth sidewalls (or side surfaces or side portions). The first and second holes H1 and H2 may be formed respectively in the upper portion and the lower portion of the holder 120 to open the upper portion and the lower portion of the holder 120, respectively. Here, the first hole H1 and the second hole H2 may be through-holes, or may be blind holes. The first lens unit may be accommodated in, mounted in, seated in, in contact with, fixed to, provisionally fixed to, supported by, coupled to, or disposed in the first hole H1, which is formed in the holder 120, and the second lens unit may be accommodated in, mounted in, seated in, in contact with, fixed to, provisionally fixed to, supported by, coupled to, or disposed in the second hole H2, which is formed in the holder 120.

In addition, the first and second sidewalls of the holder 120 may be disposed so as to face each other in a direction (e.g. the x-axis direction) perpendicular to the direction of the optical axis LX, and the third and fourth sidewalls may be disposed so as to face each other in a direction (e.g. the y-axis direction) perpendicular to the direction of the optical axis LX. In addition, as illustrated in FIG. 3, the first sidewall of the holder 120 may include a first opening OP1, and the second sidewall thereof may include a second opening OP2 having a shape that is the same as or similar to that of the first opening OP1. Thus, the first opening OP1 disposed in the first sidewall and the second opening OP2 disposed in the second sidewall may be disposed so as to face each other in a direction (e.g. the x-axis direction) perpendicular to the direction of the optical axis LX.

The inner space of the holder 120, in which the liquid lens unit 140 is disposed, may be open due to the first and second openings OP1 and OP2. In this case, the liquid lens unit 140 may be inserted through the first or second opening OP1 or OP2 so as to be mounted in, seated in, in contact with, fixed to, provisionally fixed to, supported by, coupled to, or disposed in the inner space of the holder 120. For example, the liquid lens unit 140 may be inserted into the inner space of the holder 120 through the first opening OP1.

As such, in order to allow the liquid lens unit 140 to be inserted into the inner space of the holder 120 through the first or second opening OP1 or OP2, the size of the first or second opening OP1 or OP2 in the holder 120 in the direction of the optical axis LX may be greater than the size of the liquid lens unit 140 in the z-axis direction. That is, when viewed from the x-axis direction, the area of each of the first and second openings OP1 and OP2 may be greater than the area of the liquid lens unit 140.

The second lens unit may be disposed below the liquid lens unit 140 within the holder 120. The second lens unit may be spaced apart from the first lens unit in the optical-axis direction (e.g. the z-axis direction).

The light incident on the first lens unit from outside the camera module 1000 or 1000A may pass through the liquid lens unit 140 and may be incident on the second lens unit. The second lens unit may be implemented as a single lens, or may be implemented as two or more lenses, which are aligned along the center axis to form an optical system.

Unlike the liquid lens of the liquid lens unit 140, each of the first lens unit and the second lens unit may be a solid lens formed of glass or plastic, but the embodiment is not limited as to the specific material of each of the first lens unit and the second lens unit.

The spacer 143 shown in FIG. 5 serves to accommodate at least a portion of the liquid lens 142. For example, the spacer 143 may be disposed so as to surround the liquid lens 142 and may protect the liquid lens 142 from external impacts.

The liquid lens unit 140 may be mounted in, seated in, in contact with, fixed to, provisionally fixed to, supported by, coupled to, or disposed in the inner space between the first hole and the second hole in the holder 120 in the direction of the optical axis LX or in a direction (e.g. the z-axis direction) parallel to the direction of the optical axis LX. That is, a portion of the liquid lens unit 140 may be disposed between the first lens unit and the second lens unit. However, the embodiment is not limited thereto. For example, according to another embodiment, the first lens unit or the second lens unit may be omitted, the liquid lens unit 140 may be disposed above the first lens unit within the holder 120, or the liquid lens unit 140 may be disposed below the second lens unit within the holder 120.

In addition, the liquid lens unit 140 may be disposed in the first and second openings in the holder 120. In addition, the liquid lens unit 140 may further include a part protruding to the outside from at least one point of the side portion of the holder 120 through the first and second openings.

Hereinafter, the liquid lens unit 140 will be described with reference to FIGS. 2 and 6. However, the embodiment is not limited as to the specific form of the liquid lens unit 140.

Figure 6:
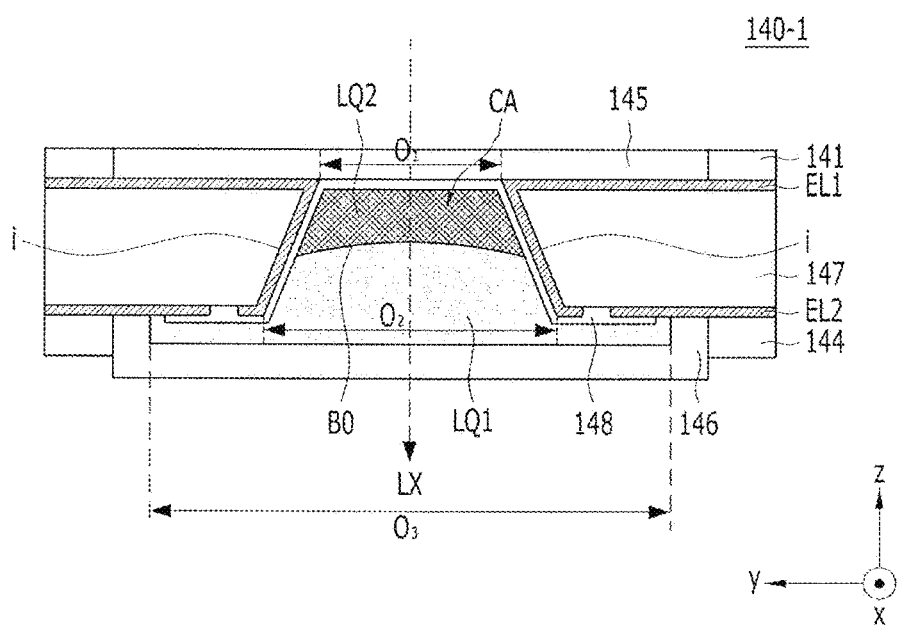
FIG. 6 illustrates a cross-sectional view of an embodiment of the liquid lens unit.

FIG. 6 illustrates a cross-sectional view of an embodiment 140-1 of the liquid lens unit 140.

Referring to FIGS. 2 and 6, the liquid lens unit 140 or 140-1 may include a liquid lens (or a liquid lens body) 142. The liquid lens 142 may further include a plurality of different types of liquids LQ1 and LQ2, first to third plates 147, 145 and 146, an insulating layer 148, and first and second electrodes EL1 and EL2.

The liquid lens 142 may include a cavity CA. As shown in FIG. 6, the open area of the cavity CA that is oriented in the direction in which light is introduced may be smaller than the open area of the cavity CA that is oriented in the opposite direction. Alternatively, the liquid lens 142 may be disposed such that the direction of inclination of the cavity CA is opposite that in the illustration. That is, unlike the illustration of FIG. 6, the open area of the cavity CA that is oriented in the direction in which light is introduced may be larger than the open area of the cavity CA that is oriented in the opposite direction. In addition, when the liquid lens 142 is disposed such that the direction of inclination of the cavity CA is opposite that in the illustration, the arrangement of all or some of the components included in the liquid lens 142 may be changed, or only the direction of inclination of the cavity CA may be changed, and the arrangement of remaining components may not be changed, depending on the direction of inclination of the liquid lens 142.

The plurality of liquids LQ1 and LQ2 may be accommodated in the cavity CA, and may include a first liquid LQ1, which is conductive, and a second liquid (or an insulative liquid) LQ2, which is non-conductive. The first liquid LQ1 and the second liquid LQ2 may not mix with each other, and an interface BO may be formed at a contact portion between the first and second liquids LQ1 and LQ2. For example, the second liquid LQ2 may be disposed on the first liquid LQ1, but the embodiment is not limited thereto.

The first liquid LQ1 may be formed of, for example, a mixture of ethylene glycol and sodium bromide (NaBr). The second liquid LQ2 may be oil, and for example, may be phenyl-based silicon oil.

Each of the first liquid LQ1 and the second liquid LQ2 may include at least one of an antioxidant or a sterilizer. The antioxidant may be a phenyl-based antioxidant or a phosphorus (P)-based antioxidant. In addition, the sterilizer may be any one of alcohol-based, aldehyde-based, and phenol-based sterilizers. When each of the first liquid LQ1 and the second liquid LQ2 includes the antioxidant and the sterilizer, it is possible to inhibit a change in the physical properties of the first and second liquids LQ1 and LQ2 due to oxidation of the first and second liquids LQ1 and LQ2 or propagation of microorganisms.

The inner surface of the first plate 147 may form a sidewall i of the cavity CA. The first plate 147 may include upper and lower openings having a predetermined inclined surface. That is, the cavity CA may be defined as a region surrounded by the inclined surface of the first plate 147, a third opening that is in contact with the second plate 145, and a fourth opening that is in contact with the third plate 146.

The diameter of the opening that is larger among the third and fourth openings may vary depending on the field of view (FOV) required for the liquid lens 142 or the role that the liquid lens 142 plays in the camera module 1000A. According to the embodiment, the size (or the area or the width) of the fourth opening $O_2$ may be greater than the size (or the area or the width) of the third opening $O_1$. Here, the size of each of the third and fourth openings may be the cross-sectional area in the horizontal direction (e.g. the x-axis direction and the y-axis direction). Each of the third and fourth openings may take the form of a hole having a circular cross-section, and the inclined surface thereof may have an inclination angle ranging from 55° to 65° or an inclination angle ranging from 50° to 70°, and may have an inclination angle of, for example, 60°. The interface BO formed by the two liquids may be moved along the inclined surface of the cavity CA by a driving voltage.

The first liquid LQ1 and the second liquid LQ2 are charged, accommodated, or disposed in the cavity CA in the first plate 147. In addition, the cavity CA is a portion through which the light that has passed through the first lens unit passes. The first plate 147 may be formed of a transparent material, or may include impurities so that light does not easily pass therethrough.

The first and second electrodes EL1 and EL2 may be respectively disposed on one surface and another surface of the first plate 147. Since the liquid lens 142 performs only a focusing function, one first electrode may be provided, or the same driving voltage may be applied to a plurality of first electrodes. In this case, one first electrode EL1 may be disposed on the top surface of the first plate 147, and one second electrode EL2 may be disposed on the bottom surface of the first plate 147. That is, the liquid lens 142 may include a total of two electrodes. The first electrode EL1 may be spaced apart from the second electrode EL2, and may be disposed on, for example, the top surface, the side surface, and the bottom surface of the first plate 147. The second electrode EL2 may be disposed on, for example, at least a portion of the bottom surface of the first plate 147. A portion of the second electrode EL2 may be in direct contact with the first liquid LQ1, which is conductive.

The interface of the liquid lens 142 may be adjusted according to the voltage between the first electrode EL1 and the second electrode EL2, and the focusing function may be performed.

Each of the first and second electrodes EL1 and EL2 may be formed of a conductive material, e.g. metal, and specifically, may include chrome (Cr). Chromium or chrome is a glossy silver rigid transition metal, which is fragile, does not readily discolor, and has a high melting point. In addition, since an alloy including chromium exhibits high corrosion resistance and rigidity, chromium may be used in the form of being alloyed with other metals. In particular, since chrome (Cr) is not easily corroded or discolored, chrome exhibits high resistance to the first liquid LQ1, which is conductive and is charged in the cavity CA.

In addition, the second plate 145 may be disposed on one surface of the first electrode EL1. That is, the second plate 145 may be disposed on the first plate 147. Specifically, the second plate 145 may be disposed on the top surface of the first electrode EL1 and on the cavity CA.

The third plate 146 may be disposed on one surface of the second electrode EL2. That is, the third plate 146 may be disposed under the first plate 147. Specifically, the third plate 146 may be disposed on the bottom surface of the second electrode EL2 and under the cavity CA.

The second plate 145 and the third plate 146 may be disposed so as to face each other, with the first plate 147 interposed therebetween. In addition, at least one of the second plate 145 or the third plate 146 may be omitted.

At least one of the second or third plate 145 or 146 may have a rectangular planar shape.

Each of the second and third plates 145 and 146 may be a region through which light passes, and may be formed of a light-transmissive material. For example, each of the second and third plates 145 and 146 may be formed of glass, and may be formed of the same material for convenience of processing. In addition, the edge of each of the second and third plates 145 and 146 may have a rectangular shape, without being necessarily limited thereto.

The second plate 145 may be configured so as to allow the light introduced from the first lens unit to travel into the cavity CA in the first plate 147.

The third plate 146 may be configured so as to allow the light that has passed through the cavity CA in the first plate 147 to travel to the second lens unit. The third plate 146 may be in direct contact with the first liquid LQ1.

According to the embodiment, the third plate 146 may have a diameter greater than the diameter of the opening that is larger among the third and fourth openings in the first plate 147.

In addition, the actual effective lens area of the liquid lens 142 may be smaller than the diameter (e.g. $O_2$) of the opening that is larger among the third and fourth openings in the first plate 147. For example, when a region within a small radius about the center of the liquid lens 142 is used as an actual light transmission path, the diameter (e.g. $O_3$) of the center area of the third plate 146 may be smaller than the diameter (e.g. $O_2$) of the opening that is larger among the third and fourth openings in the first plate 147.

The insulating layer 148 may be disposed so as to cover a portion of the bottom surface of the second plate 145 in the upper area of the cavity CA. That is, the insulating layer 148 may be disposed between the second liquid LQ2 and the second plate 145.

In addition, the insulating layer 148 may be disposed so as to cover the portion of the first electrode EL1 that forms the sidewall of the cavity CA. In addition, the insulating layer 148 may be disposed on the bottom surface of the first plate 147 so as to cover a portion of the first electrode EL1, the bottom surface of the first plate 147, and a portion of the second electrode EL2. Accordingly, contact between the first electrode EL1 and the first liquid LQ1 and contact between the first electrode EL1 and the second liquid LQ2 may be inhibited by the insulating layer 148.

The insulating layer 148 may be formed of, for example, a coating agent such as parylene C, and may further include a white dye. The white dye may increase the rate of reflection of light from the insulating layer 148, which forms the sidewall i of the cavity CA.

The insulating layer 148 may cover one (e.g. the first electrode EL1) of the first and second electrodes EL1 and EL2, and may expose a portion of the other electrode (e.g. the second electrode EL2), so that electric energy is applied to the first liquid LQ1, which is conductive.

In addition, the liquid lens unit 140 or 140-1 may further include at least one substrate. Here, the at least one substrate may include at least one of a first connection substrate 141 or a second connection substrate 144.

The first connection substrate 141 and the second connection substrate 144 serve to supply a driving voltage to the liquid lens 142. The first connection substrate 141 may transmit a driving voltage (hereinafter referred to as an 'individual voltage/first voltage') to the liquid lens 142, and the second connection substrate 144 may transmit a driving voltage (hereinafter referred to as a 'common voltage/second voltage') to the liquid lens 142. The common voltage may include DC voltage or AC voltage. When the common voltage is applied in the form of a pulse, the width or duty cycle of the pulse may be constant.

One end of the first connection substrate 141 may be electrically connected to the first electrode EL1, and one end of the second connection substrate 144 may be electrically connected to the second electrode EL2.

When a driving voltage is applied to the first and second electrodes EL1 and EL2 through the first connection substrate 141 and the second connection substrate 144, the interface BO between the first liquid LQ1 and the second liquid LQ2 may be deformed, and thus at least one of the shape, such as a curvature, or the focal length of the liquid lens 142 may be changed (or adjusted). For example, the focal length of the liquid lens 142 may be adjusted as at least one of the flexure or the inclination of the interface BO formed in the liquid lens 142 is changed according to the driving voltage. When the deformation or the radius of curvature of the interface BO is controlled, the liquid lens 142, the lens assembly 22 including the liquid lens 142, the camera module 1000 or 1000A, and the optical device may perform an AF function. That is, the liquid lens 142 in the camera module 1000 or 1000A according to the embodiment performs only an AF function.

Hereinafter, an embodiment of the signal transmission unit 30 shown in FIG. 1, which transmits a driving voltage to the liquid lens unit 140, will be described with reference to the accompanying drawings.

According to the embodiment, the signal transmission unit may include first and second connection parts CP1 and CP2, first and second pads 302 and 304, and third and fourth connection substrates 322 and 324.

The first connection part CP1 has one end electrically connected to the opposite end of the first connection substrate 141. As described above, one end of the first connection substrate 141 is electrically connected to the first electrode EL1. The second connection part CP2 has one end electrically connected to the opposite end of the second connection substrate 144. As described above, one end of the second connection substrate 144 is electrically connected to the second electrode EL2.

The first pad 302 may be electrically connected to the opposite end of the first connection part CP1, and the second pad 304 may be electrically connected to the opposite end of the second connection part CP2. Referring to FIG. 4A, the first and second pads 302 and 304 may be disposed on the top surface of the moving body 410 so as to be spaced apart from each other, but the embodiment is not limited as to the specific planar arrangement in which the first and second pads 302 and 304 are disposed. In the case in which the moving body 410, which is made of a conductive material, is divided into the first and second moving segments MS1 and MS2, the first and second pads 302 and 304 may be respectively disposed on the first and second moving segments MS1 and MS2, which are electrically isolated from each other. For example, the first pad 302 may correspond to a (+) terminal (or a (−) terminal), and the second pad 304 may correspond to a (−) terminal (or a (+) terminal).

The third connection substrate 322 may serve to electrically connect the first pad 302 to the liquid-lens-driving unit 154, and the fourth connection substrate 324 may serve to electrically connect the second pad 304 to the liquid-lens-driving unit 154. For example, as shown in FIG. 2, the third and fourth connection substrates 322 and 324 may be disposed on the fixed body 420, but the embodiment is not limited thereto. In FIG. 2, the third and fourth connection substrates 322 and 324 and the main board 152 are illustrated as being spaced apart from each other, but the third and fourth connection substrates 322 and 324 and the main board 152 are electrically connected to each other. For example, the third and fourth connection substrates 322 and 324 may be electrically connected to the main board 152 through soldering.

In addition, although the third and fourth connection substrates 322 and 324 are illustrated in FIG. 2 as being provided separately from each other, the embodiment is not limited thereto. That is, the third and fourth connection substrates 322 and 324 may be implemented as a single connection substrate. In this case, a pattern for electrically connecting the first pad 302 to the liquid-lens-driving unit 154 and a pattern for electrically connecting the second pad 304 to the liquid-lens-driving unit 154 may be formed on a single connection substrate.

In addition, the signal transmission unit may further include first and second elastic members 312 and 314. The first elastic member 312 serves to electrically connect the first pad 302 to the third connection substrate 322, and the second elastic member 314 serves to electrically connect the second pad 304 to the fourth connection substrate 324.

In addition, the first and second elastic members 312 and 314 may be respectively electrically connected to the first and second pads 302 and 304 via the moving body 410. For example, although not shown in FIG. 2, the first and second pads 302 and 304 shown in FIG. 4A may penetrate the moving body 410, and may be respectively electrically connected to the first and second elastic members 312 and 314. As such, since the first and second pads 302 and 304 and the first and second elastic members 312 and 314 are respectively electrically connected to each other through the moving body 410, it is illustrated in FIG. 1 that the driving voltage from the control unit 24 is provided to the signal transmission unit 30 via the lens-moving unit 28. However, in the case in which the first and second pads 302 and 304 and the first and second elastic members 312 and 314 are connected to each other by bypassing the moving body 410, rather than passing through the moving body 410, the driving voltage output from the control unit 24 is directly provided to the signal transmission unit 30 in FIG. 1.

In addition, one end of at least one of the first or second elastic member 312 or 314 may be connected to a lower portion or side portion of the moving body 410. For example, as illustrated in FIG. 2, one end of each of the first and second elastic members 312 and 314 may be connected to a lower portion of the moving body 410.

Meanwhile, the cover 170 shown in FIG. 2 may be disposed so as to surround the holder 120, the liquid lens unit 140, the base 172, and a part of the lens-moving unit, thereby protecting the components (120, 140, 172, and a part of the lens-moving unit) from external impacts. The part of the lens-moving unit that is surrounded by the cover 170 is a component that is disposed between the base 172 and the fixed body 420, but the embodiment is not limited as to the specific component of the lens-moving unit that is surrounded by the cover 170. The cover 170 may protect a plurality of lenses forming an optical system from external impacts. However, the first cover 170 may be omitted.

Meanwhile, the aforementioned first and second connection parts CP1 and CP2 may be electrically connected to the first and second pads 302 and 304 and/or to the first and second connection substrates 141 and 144 in various forms.

According to an embodiment, the first and second connection parts CP1 and CP2 may be disposed on the surface of the base 172, as shown in FIG. 2. The base 172 may accommodate the lens assembly, i.e. the holder 120, and may be disposed on the support surface 410S of the moving body 410. The base 172 may be designed as a molded interconnect device (MID) type so that the first and second connection parts CP1 and CP2, which electrically connect the first and second connection substrates 141 and 144 to the first and second pads 302 and 304, are disposed on the surface thereof.

Hereinafter, for better understanding of the base 172 and the first and second connection parts CP1 and CP2 shown in FIG. 2, examples of the base 172 and the first and second connection parts CP1 and CP2 will be described with reference to FIG. 7, but the embodiment is not limited as to the specific structures of the base 172 and the first and second connection parts CP1 and CP2.

Figure 7:
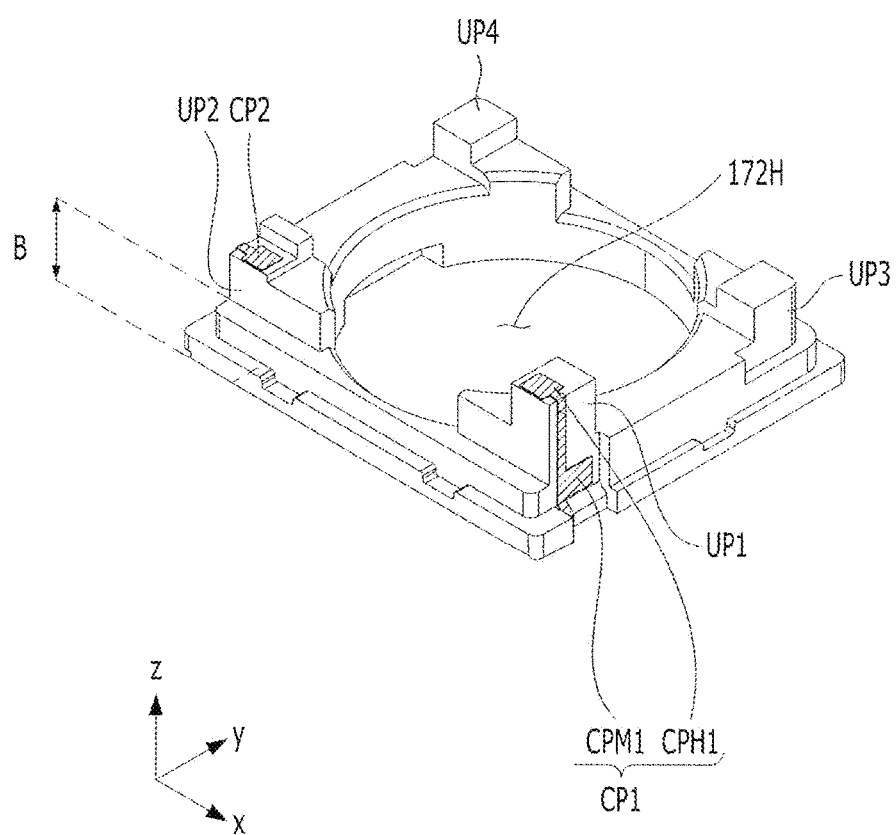
FIG. 7 illustrates a top perspective view of the base shown in FIG. 2.

FIG. 7 illustrates a top perspective view of the base 172 shown in FIG. 2.

The first connection part CP1 of the base 172 may be electrically connected to the first connection substrate 141, and the second connection part CP2 may be electrically connected to the second connection substrate 144. The first connection substrate 141 may be electrically connected to the first pad 302 via the first connection part CP1 of the base 172. In addition, the second connection substrate 144 may be electrically connected to the second pad 304 via the second connection part CP2 of the base 172.

The base 172 may serve to transmit a driving signal (e.g. a driving voltage) output from the liquid-lens-driving unit 152 to the liquid lens unit 140 using the first and second connection parts CP1 and CP2, and may be disposed on the moving body 410, as shown in FIG. 2.

Referring to FIG. 7, the base 172 may include a body B, a plurality of pillars UP1 to UP4, and connection parts CP1 and CP2.

The body B of the base 172 may be disposed so as to surround the second hole in the holder 120. That is, the holder 120 may be disposed in the body B. Here, a receiving hole 172H in the base 172 is shown as having a circular shape, but the embodiment is not limited thereto. The shape thereof may be changed to any of various shapes. The receiving hole 172H may be formed near the center of the base 172 at a position corresponding to the position of the image sensor 26A disposed in the camera module 1000A.

The plurality of pillars may protrude upwards (e.g. the +z-axis direction) in a direction parallel to the optical-axis direction from the top surface of the body B.

The first and second connection parts CP1 and CP2 serve to electrically connect the first and second connection substrates 141 and 144, which are connected to the liquid lens unit 140, to the first and second pads 302 and 304.

For example, the first connection part CP1 may be disposed over one surface of the first pillar UP1, among the plurality of pillars, and one surface of the body B. The second connection part CP2 may be disposed over one surface of the second pillar UP2, among the plurality of pillars, and the opposite surface of the body B.

The first connection part CP1 may include a first intermediate connection portion CPM1 and a first upper connection portion CPH1. The first upper connection portion CPH1 may be disposed on the top surface of one (e.g. the first pillar UP1) of the plurality of pillars, and may be electrically connected to a portion of the first connection substrate 141. The first intermediate connection portion CPM1 may be disposed over a side surface of the first pillar UP1 and a side surface of the body B, and may be electrically connected to the first pad 302.

Similarly, the second connection part CP2 may include a second intermediate connection portion and a second upper connection portion. The second upper connection portion may be disposed on the top surface of another one (e.g. the second pillar UP2) of the plurality of pillars, and may be electrically connected to a portion of the second connection substrate 144. The second intermediate connection portion may be disposed over a side surface of the second upper pillar UP2 and a side surface of the body B, and may be electrically connected to the second pad 304.

In addition, the first and second connection parts CP1 and CP2 may be disposed on respective sidewalls of the base 172 that face each other in a direction (e.g. the x-axis direction) intersecting the direction of the optical axis LX (e.g. the z-axis direction). As illustrated, each of the first and second connection parts CP1 and CP2 may be a surface electrode or a surface electrode pattern formed on the surface of the base 172, but the embodiment is not limited as to the specific shapes of the first and second connection parts CP1 and CP2.

According to another embodiment, the first and second connection parts CP1 and CP2 may be disposed on the surface of the holder 120, unlike the illustration in FIG. 2.

According to still another embodiment, the first and second connection parts CP1 and CP2 may be omitted. In this case, each of the first and second connection substrates 141 and 144 may be bent in a direction oriented toward the moving body 410 (e.g. the −z-axis direction). In this case, the end portions of the first and second connection substrates 141 and 144 that are bent may be directly electrically connected to the first and second pads 302 and 304.

Meanwhile, the lens-moving unit shown in FIG. 2 may further include a plurality of fifth connection substrates 326 and 328. In FIG. 2, the plurality of fifth connection substrates 326 and 326 and the main board 152 may be electrically connected to each other through soldering.

The plurality of fifth connection substrates 326 and 328 serves to electrically connect the wire-driving unit 156 to the plurality of wires 440. Although only two fifth connection substrates 326 and 328 are shown in FIG. 2, the embodiment is not limited thereto. That is, the fifth connection substrates 326 and 328 may be provided in the same number as the plurality of wires 440. Alternatively, the plurality of fifth connection substrates 326 and 328 may be implemented as a single connection substrate, so that patterns for electrically connecting the plurality of wires 440 to a plurality of electrical signals independently of each other may be formed on a single connection substrate.

The image sensor 26A may perform a function of converting the light that has passed through the first lens unit, the liquid lens unit 140, and the second lens unit of the lens assembly 22 into image data. More specifically, the image sensor 26A may generate image data by converting light into analog signals via a pixel array including a plurality of pixels and synthesizing digital signals corresponding to the analog signals.

Hereinafter, a process in which the driving voltage generated by the liquid-lens-driving unit 154 is transmitted to the liquid lens 142 in the camera module 1000A having the above-described configuration will be described.

The liquid-lens-driving unit 154 may be electrically connected to the main board 152. In this case, the driving voltage generated by the liquid-lens-driving unit 154 may be provided to the third and fourth connection substrates 322 and 324 via the main board 152. The third and fourth connection substrates 322 and 324 respectively supply the driving voltage provided from the main board 152 to the first and second pads 302 and 304 via the first and second elastic members 312 and 314. The first and second pads 302 and 304 provide the driving voltage, received through the first and second elastic members 312 and 314, to the first and second connection substrates 141 and 144 through the first and second connection parts CP1 and CP2. Accordingly, the driving voltage may be supplied to the first and second electrodes EL1 and EL2 of the liquid lens unit 140 through the first and second connection substrates 141 and 144. Accordingly, the liquid lens unit 140 may receive the driving voltage from the liquid-lens-driving unit 152 through the above-described signal flow path and may perform the AF function.

In addition, a process in which a horizontal control signal including a plurality of electrical signals generated by the wire-driving unit 156 is transmitted to the plurality of wires 440 in the camera module 1000A having the above-described configuration will be described below.

The wire-driving unit 156 may be electrically connected to the main board 152. In this case, the plurality of electrical signals generated by the wire-driving unit 156 may be provided to the plurality of fifth connection substrates 326 and 328 through the main board 152. The plurality of fifth connection substrates 326 and 328 provides a plurality of electrical signals provided from the main board 152 to the plurality of wires 440. For example, it is assumed that the first to fourth wires SW1 to SW4 shown in FIG. 4A or 4B respectively contract or expand in response to first to fourth electrical signals. In this case, the first to fourth electrical signals are respectively supplied to the first to fourth wires SW1 to SW4 through the above-described signal flow path, so that the first to fourth wires SW1 to SW4 operate independently of each other, whereby the liquid lens unit 140 supported by the moving body 410 moves in the horizontal direction together with the moving body 410, thereby performing the OIS operation.

Hereinafter, the movement of the holder 120 (or the moving body 410) in the horizontal direction by the plurality of wires SW1 to SW4 that contract or expand independently of each other will be described with reference to the accompanying drawings.

FIGS. 8(a) to (d) illustrate plan views of various movement patterns of the holder 120 in the horizontal direction when the first to fourth wires SW1 to SW4 independently expand or contract. FIGS. 4A and 4B illustrate a configuration in which the holder 120 shown in FIGS. 8(a) to (d) is replaced with the moving body 410.

In the coordinate system shown in FIGS. 8(a) to (d), the y'-axis indicates an axis that is shifted 45° from the y-axis in the counterclockwise direction, the x'-axis indicates an axis that is shifted 45° from the x-axis in the counterclockwise direction, and the x'-axis and the y'-axis may intersect each other perpendicularly. Further, X1 to X4 indicate coordinates on the x'-axis, and Y1 to Y4 indicate coordinates on the y'-axis.

As shown in FIG. 8(a), when the first to fourth electrical signals are not supplied to the first to fourth wires SW1 to SW4, or when the level of each of the first to fourth electrical signals that are supplied is a reference level, the moving body 410 is kept stationary without moving in the horizontal direction.

Figure 8:
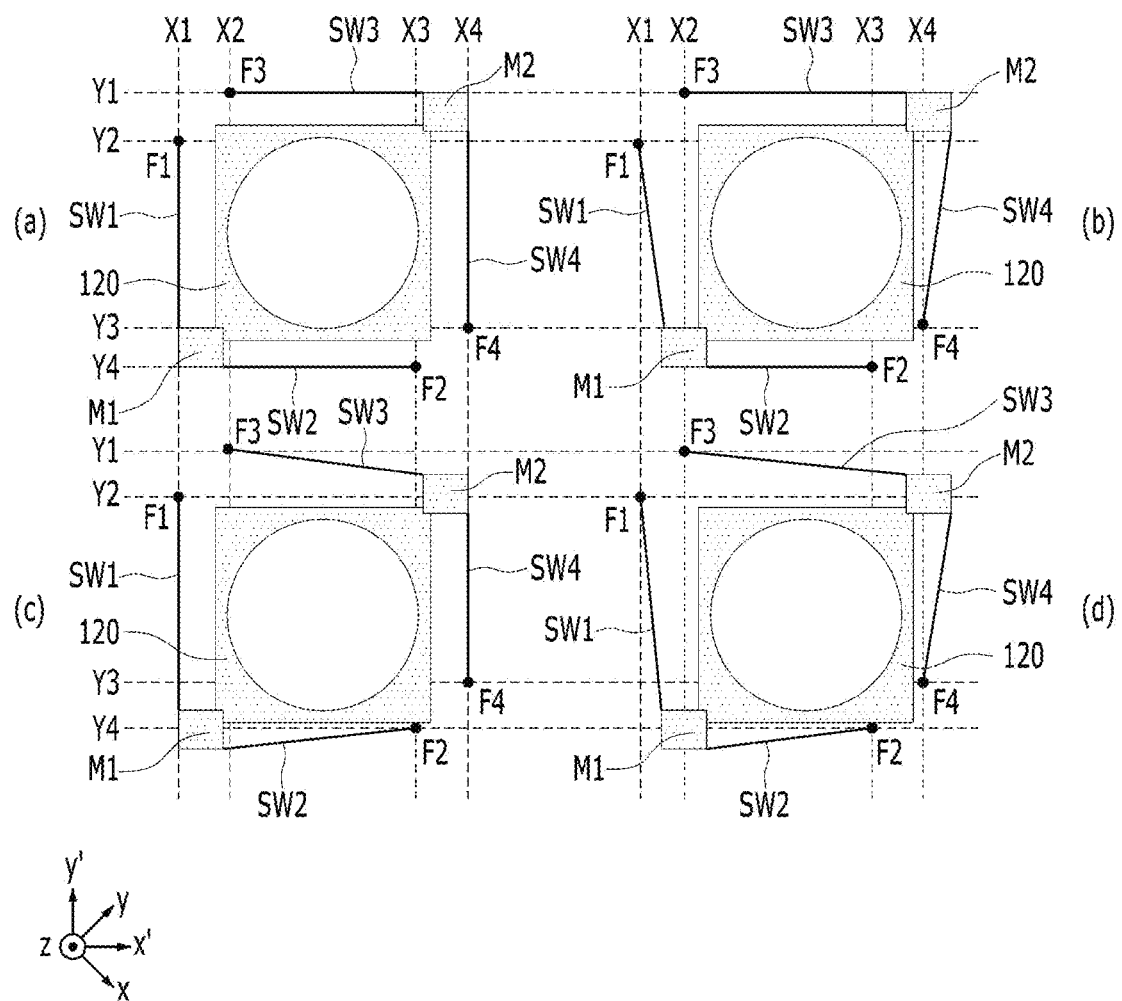
FIGS. 8(a) to (d) illustrate plan views of various movement patterns of the holder in a horizontal direction when first to fourth wires independently expand or contract.

As shown in FIG. 8(*b*), it can be seen that, when the second wire SW2 contracts in response to the second electrical signal and is thus reduced in length and the third wire SW3 expands in response to the third electrical signal and is thus increased in length, the moving body 410 moves in the +x'-axis direction, which is the horizontal direction. In this case, the first and fourth wires SW1 and SW4 may expand so that the moving body 410 is capable of moving in the +x'-axis direction.

As shown in FIG. 8(*c*), it can be seen that, when the fourth wire SW4 contracts in response to the fourth electrical signal and is thus reduced in length and the first wire SW1 expands in response to the first electrical signal and is thus increased in length, the moving body 410 moves in the −y'-axis direction, which is the horizontal direction. In this case, the second and third wires SW2 and SW3 may expand so that the moving body 410 is capable of moving in the −y'-axis direction.

As shown in FIG. 8(*d*), it can be seen that, when the second wire SW2 contracts in response to the second electrical signal and is thus reduced in length and the fourth wire SW4 contracts in response to the fourth electrical signal and is thus reduced in length, the moving body 410 moves in the +x'-axis direction and the −y'-axis direction, which are horizontal directions. In this case, the first and third wires SW1 and SW3 may expand so that the moving body 410 is capable of moving in the +x'-axis direction and the −y'-axis direction.

Hereinafter, a camera module according to a comparative example and the camera module according to the embodiment will be described with reference to the accompanying drawings.

Figure 9A:
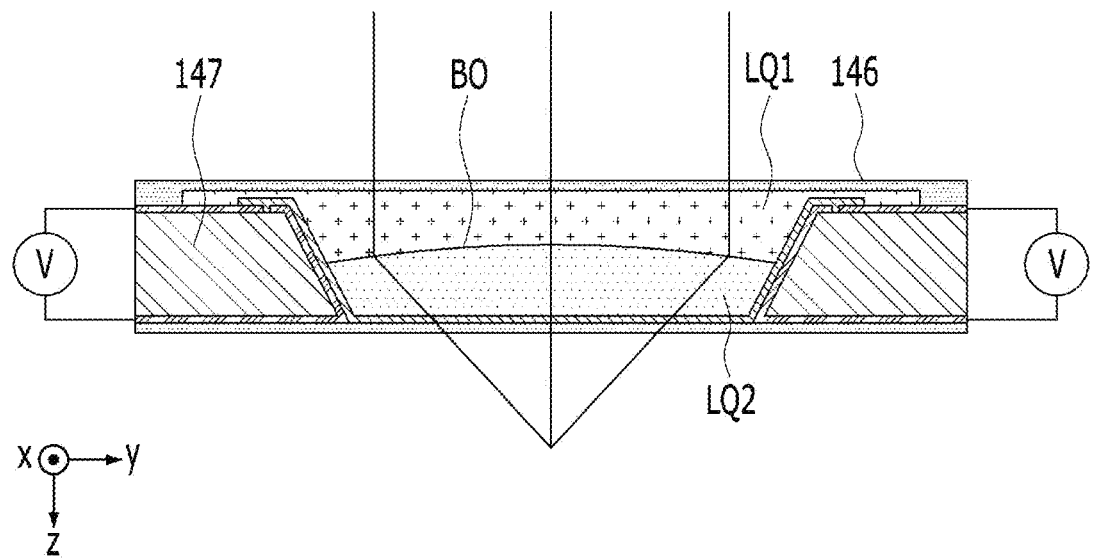
FIGS. 9A and 9B are views for explaining the operation of the liquid lens unit.
Figure 9B:
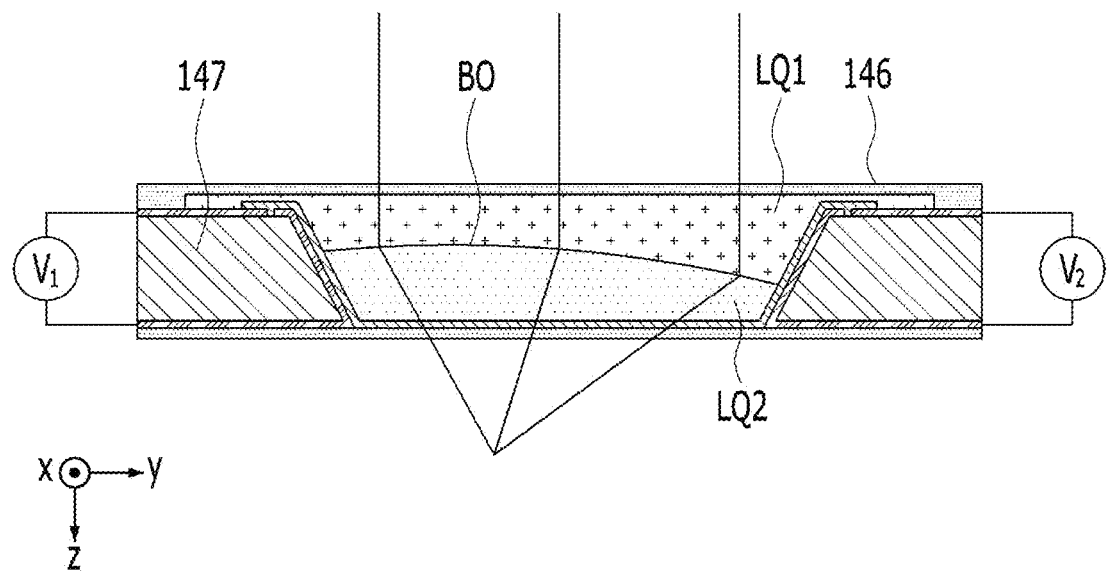

FIGS. 9A and 9B are views for explaining the operation of the liquid lens unit, and the same reference numerals are used for the same parts as those of the liquid lens unit 140-1 shown in FIG. 6.

FIG. 9A illustrates a state in which the interface BO between the liquids included in the liquid lens unit 140-1 becomes convex when a driving voltage is applied thereto. As the interface BO between the liquids LQ1 and LQ2 becomes convex or concave, the focal length of the liquid lens unit 140-1 oriented along the optical axis is changed, whereby the AF function may be performed.

FIG. 9B illustrates a state in which the interface BO between the liquids included in the liquid lens unit 140-1 is tilted when a driving voltage is applied thereto. As the interface BO between the liquids LQ1 and LQ2 is tilted, the focal length of the liquid lens unit 140-1 oriented along the optical axis is shifted in a direction perpendicular to the optical axis, whereby the OIS function may be performed.

However, as shown in FIG. 9B, when the OIS function is performed by tilting the interface BO between the liquids LQ1 and LQ2, the OIS function may not be appropriately performed. This may decrease the resolution of a peripheral region of an image acquired through the image sensor 26A.

Accordingly, in the case of the camera module 1000 or 1000A according to the embodiment described above, the liquid lens unit 140 performs only the AF function, and the lens-moving unit 28, which is disposed between the lens assembly 22 and the image sensor 26 along the optical axis, performs the OIS function. Thereby, the OIS function may be accurately performed and enhanced compared to the comparative example shown in FIG. 9B. Accordingly, the resolution of a peripheral region of an image acquired through the image sensor 26A may be improved compared to the comparative example.

Further, the camera module 1000 or 1000A according to the embodiment performs the OIS function using a plurality of wires, rather than using a magnet, and therefore has a smaller size than a camera module that performs an OIS function using a magnet, and thus is capable of being used for, for example, a dual-camera module.

Meanwhile, an optical device may be implemented using the camera module 1000 or 1000A including the lens assembly according to the embodiment described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a lens assembly.

In addition, the optical device may be implemented in a portable device such as, for example, a smartphone, a laptop computer, or a tablet computer. Such an optical device may include the camera module 1000 or 1000A, a display unit (not shown) configured to output an image, a battery (not shown) configured to supply power to the camera module 1000 or 1000A, and a body housing in which the camera module 1000 or 1000A, the display unit, and the battery are mounted. The optical device may further include a communication module, which may communicate with other devices, and a memory unit, which may store data. The communication module and the memory unit may also be mounted in the body housing.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and essential characteristics of the disclosure set forth herein. Accordingly, the above detailed description is not intended to be construed to limit the disclosure in all aspects and is to be considered by way of example. The scope of the disclosure should be determined by reasonable interpretation of the appended claims and all equivalent modifications made without departing from the disclosure should be included in the following claims.

Mode for Invention

Various embodiments have been described in the best mode for carrying out the disclosure.

INDUSTRIAL APPLICABILITY

A camera module according to embodiments may be used in camera/video devices, telescopic devices, microscopic devices, an interferometer, a photometer, a polarimeter, a spectrometer, a reflectometer, an auto-collimator, a lens-meter, a smartphone, a laptop computer, a tablet computer, etc.

The invention claimed is:

1. A camera module, comprising:
a lens assembly accommodating a liquid lens unit;
an image sensor disposed along an optical axis of the liquid lens unit;

a lens-moving unit disposed along the optical axis between the lens assembly and the image sensor, the lens-moving unit being configured to move the lens assembly in a horizontal direction perpendicular to the optical axis of the liquid lens unit in response to a horizontal control signal;

a base accommodating the lens assembly; and a control unit configured to supply a driving voltage to drive the liquid lens unit such that a focal length oriented along the optical axis is changed and to generate the horizontal control signal, wherein the lens-moving unit comprises:
   a fixed body;
   a moving body disposed on the fixed body so as to be movable in the horizontal direction, the moving body comprising a support surface supporting the lens assembly; and
   a plurality of wires configured to contract or expand independently of each other so as to move the moving body in the horizontal direction in response to the horizontal control signal, each of the plurality of wires comprising one end connected to the fixed body and an opposite end connected to the moving body, wherein the base is disposed on the support surface of the moving body, wherein the base comprises a body and a plurality of pillars protruding in a direction parallel to the optical axis from an upper surface of the body, wherein a first connection part of a signal transmission unit is disposed over a surface of a first pillar, of the plurality of pillars, and one surface of the body, and wherein a second connection part of the signal transmission unit is disposed over a surface of a second pillar, of the plurality of pillars, and an opposite surface of the body.

2. The camera module according to claim 1, wherein the control unit comprises:
   a liquid-lens-driving unit configured to generate the driving voltage;
   a wire-driving unit configured to generate a plurality of electrical signals as the horizontal control signal to respectively contract or expand the plurality of wires; and
   a main board on which the image sensor is disposed.

3. The camera module according to claim 2, comprising:
   the signal transmission unit, which is configured to transmit the driving voltage generated by the liquid-lens-driving unit to the liquid lens unit.

4. The camera module according to claim 3, wherein the liquid lens unit comprises:
   a liquid lens comprising a plate accommodating different types of first and second liquids and first and second electrodes respectively disposed on one surface and an opposite surface of the plate to receive the driving voltage;
   a first connection substrate comprising one end connected to the first electrode; and
   a second connection substrate comprising one end connected to the second electrode.

5. The camera module according to claim 4, wherein the signal transmission unit comprises:
   the first connection part comprising one end connected to the first connection substrate;
   the second connection part comprising one end connected to the second connection substrate;
   a first pad connected to an opposite end of the first connection part; and
   a second pad connected to an opposite end of the second connection part.

6. The camera module according to claim 5, wherein the signal transmission unit comprises:
   a third connection substrate connecting the first pad to the liquid-lens-driving unit;
   a fourth connection substrate connecting the second pad to the liquid-lens-driving unit;
   a first elastic member electrically connecting the first pad to the third connection substrate; and
   a second elastic member electrically connecting the second pad to the fourth connection substrate.

7. The camera module according to claim 5, wherein the moving body comprises a plurality of moving segments electrically isolated from each other, and
   wherein inner sides of the plurality of moving segments define a path along which light travels from the liquid lens unit to the image sensor.

8. The camera module according to claim 7, wherein the plurality of wires comprises:
   a first wire comprising one end connected to a first movable point of a first moving segment, among the plurality of moving segments, and an opposite end connected to a first fixed point of the fixed body;
   a second wire comprising one end connected to the first movable point of the first moving segment and an opposite end connected to a second fixed point of the fixed body;
   a third wire comprising one end connected to a second movable point of a second moving segment, among the plurality of moving segments, and an opposite end connected to a third fixed point of the fixed body; and
   a fourth wire comprising one end connected to the second movable point of the second moving segment and an opposite end connected to a fourth fixed point of the fixed body.

9. The camera module according to claim 8, wherein the first movable point and the second movable point face each other in a diagonal direction in a plane,
   wherein the first fixed point and the second fixed point face each other in a diagonal direction in a plane,
   wherein the third fixed point and the fourth fixed point face each other in a diagonal direction in a plane,
   wherein the first fixed point and the third fixed point are adjacent to each other, and
   wherein the second fixed point and the fourth fixed point are adjacent to each other.

10. The camera module according to claim 1, wherein the lens-moving unit includes a plurality of balls disposed between the fixed body and the moving body so as to support the moving body and to be rotatable.

11. The camera module according to claim 2, wherein the lens-moving unit includes a plurality of fifth connection substrates respectively electrically connecting the wire-driving unit to the plurality of wires.

12. The camera module according to claim 11, wherein the plurality of fifth connection substrates is configured to be electrically connected to the main board through soldering.

13. The camera module according to claim 4, wherein the signal transmission unit comprises:
   a first pad configured to be electrically connected to an end portion of the first connection substrate bent in a direction oriented toward the moving body; and a second pad configured to be electrically connected to an end portion of the second connection substrate bent in the direction oriented toward the moving body.

14. The camera module according to claim 5, comprising a cover disposed so as to surround the lens assembly, the base, and a part of the lens-moving unit.

15. The camera module according to claim 6, wherein one end of at least one of the first or second elastic member is connected to a lower portion or a side portion of the moving body.

16. The camera module according to claim 6, wherein the first and second elastic members are configured to be electrically connected to the first and second pads, respectively, by penetrating the moving body.

17. The camera module according to claim 6, wherein the first and second elastic members are configured to be electrically connected to the first and second pads, respectively, by bypassing the moving body.

18. The camera module according to claim 7, wherein the first and second pads are disposed on a top surface of the moving body so as to be spaced apart from each other.

19. A camera module, comprising:
a lens assembly accommodating a liquid lens unit;
an image sensor disposed along an optical axis of the liquid lens unit;
a lens-moving unit disposed along the optical axis between the lens assembly and the image sensor, the lens-moving unit being configured to move the lens assembly in a horizontal direction perpendicular to the optical axis of the liquid lens unit in response to a horizontal control signal;
a base accommodating the lens assembly; and
a control unit configured to supply a driving voltage to drive the liquid lens unit such that a focal length oriented along the optical axis is changed and to generate the horizontal control signal,
wherein the lens-moving unit comprises:
  a fixed body;
  a moving body disposed on the fixed body so as to be movable in the horizontal direction, the moving body comprising a support surface supporting the lens assembly; and
  a plurality of wires configured to contract or expand independently of each other so as to move the moving body in the horizontal direction in response to the horizontal control signal, each of the plurality of wires comprising one end connected to the fixed body and an opposite end connected to the moving body,
wherein the control unit comprises:
  a liquid-lens-driving unit configured to generate the driving voltage;
  a wire-driving unit configured to generate a plurality of electrical signals as the horizontal control signal to respectively contract or expand the plurality of wires; and
  a main board on which the image sensor is disposed,
wherein the camera module comprises a signal transmission unit configured to transmit the driving voltage generated by the liquid-lens-driving unit to the liquid lens unit,
wherein the liquid lens unit comprises:
  a liquid lens comprising a plate accommodating different types of first and second liquids and first and second electrodes respectively disposed on one surface and an opposite surface of the plate to receive the driving voltage;
  a first connection substrate comprising one end connected to the first electrode; and
  a second connection substrate comprising one end connected to the second electrode,
wherein the signal transmission unit comprises:
  a first connection part comprising one end connected to the first connection substrate;
  a second connection part comprising one end connected to the second connection substrate;
  a first pad connected to an opposite end of the first connection part:
  a second pad connected to an opposite end of the second connection part;
  a third connection substrate connecting the first pad to the liquid-lens-driving unit; and
  a fourth connection substrate connecting the second pad to the liquid-lens-driving unit,
wherein the base is disposed on the support surface of the moving body,
wherein the first and second connection parts are disposed on a surface of the base
wherein the base comprises:
  a body; and
a plurality of pillars protruding in a direction parallel to the optical-axis from an upper surface of the body,
wherein the first connection part is disposed over one surface of one pillar, among the plurality of pillars, and one surface of the body, and
wherein the second connection part is disposed over one surface of another pillar, among the plurality of pillars, and an opposite surface of the body.

* * * * *